Aug. 13, 1929.  R. L. GILLILAND ET AL  1,724,573
COTTON CLEANING MACHINE
Original Filed Aug. 10, 1926
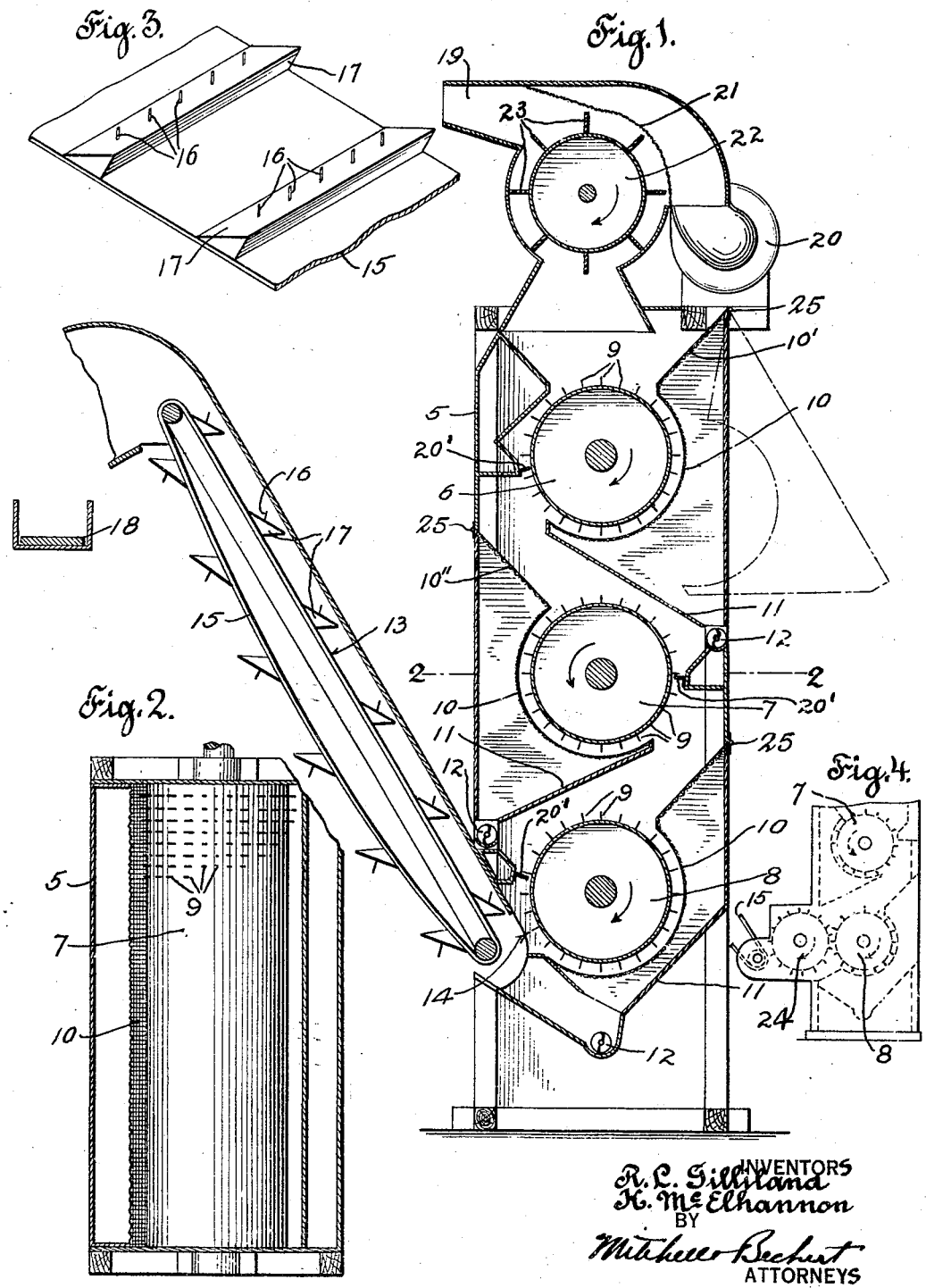

Patented Aug. 13, 1929.

1,724,573

UNITED STATES PATENT OFFICE.

ROB L. GILLILAND, OF ANTHONY, NEW MEXICO, AND HOUSTON McELHANNON, OF CANUTILLO, TEXAS.

COTTON-CLEANING MACHINE.

Application filed August 10, 1926, Serial No. 128,382. Renewed July 1, 1929.

Our invention relates to a machine particularly adapted for cleaning seed cotton.

Seed cotton, as it arrives at the gin, often contains an assortment of foreign matter, including leaves, twigs, cotton bolls, sand, stones, nails, bits of metal, and various other foreign matter. It is highly desirable to remove as much of this foreign matter as possible before the seed cotton reaches the gin saws. If much foreign matter be left in the ginned cotton, the grade is lowered and consequently the price obtainable is substantially lower.

It is the principal object of our invention, therefore, to provide improved means for removing a large proportion of the foreign matter from seed cotton before the same is ginned. The novel features of our invention will be more fully described hereinafter and one particular embodiment illustrated.

Briefly stated, in the preferred form, our invention includes a plurality of rotatable drums having pins or projections on the surface thereof for engaging and conveying seed cotton past screens, which preferably partially encircle the drums. Much of the smaller foreign matter passes through the screens and is conducted away. The seed cotton then passes preferably to an elevator which carries the cotton upwardly, preferably at a relatively sharp angle, so that other and larger foreign material, such as cotton bolls, twigs, and the like may be permitted to fall away from the cotton by gravity, thus cleaning the seed cotton before it reaches the gin.

In the drawings which show, for illustrative purposes only, a preferred form of the invention—

Fig. 1 is a vertical sectional view through a cleaning machine;

Fig. 2 is a fragmentary sectional view taken substantially in the plane of the line 2—2 of Fig. 1;

Fig. 3 is an enlarged fragmentary view of an elevator belt;

Fig. 4 is a diagrammatic view of a modification.

In said drawings, 5 indicates a main frame or casing of our cleaning machine, which may be positioned on the floor adjacent the gin stands. Within the casing are one or more drums 6—7—8, and, when a plurality of drums are employed, adjacent drums are rotatable in opposite directions for a purpose to be described. The drums may be rotated by suitable belts or gears (not shown). The drums are provided on their surfaces with means, such as projecting pins 9—9, which are adapted to engage the seed cotton and conduct the same during the rotation of the drums.

Adjacent each drum is a screen 10 which partially encircles the drum so that seed cotton carried around by the pins on the drums may be caused to pass over the screen surfaces 10—10, and much of the finer foreign material, such as sand, leaf fragments, matches, twigs and the like, may become separated from the cotton and drop into the dirt pans 11—11 positioned beneath the screens. Material passing through the screens and falling upon the dirt pans 11—11 may slide down and be conducted away as by means of conveyers 12—12. In the form shown, each screen 10 is held so as to be removable to permit access to the drums for cleaning, repair, or other purposes. The particular form shown indicates that the screen and dirt pan, together with a portion of the outside casing, are hinged at 25 and may be swung outwardly as shown in dot and dash lines in Fig. 1. Now, since the screens 10—10 are preferably of relatively small mesh, say one-quarter of an inch, so as to permit only the finer foreign matter to be removed from the cotton and to prevent the cotton itself from dropping through the screens, we employ additional means for permitting larger foreign particles, such as bolls, twigs, leaves, and the like to be separated from the cotton.

In the form shown, there is an elevator 13 at the outlet 14 from the last conveying drum 8. This elevator may be a simple form of enclosed belt 15 running over pulleys at the top and bottom, as shown particularly in Fig. 1. The belt is preferably provided with cotton engaging projections, such as pins 16—16, extending across the belt transversely. We may secure slats 17—17 on the belt at suitable intervals, and the pins 16 are secured on these slats. As shown, the slats are bevelled off so that foreign matter will not be held by the slats but may slide down by gravity, and the elevator belt is preferably inclined sharply so as to permit this gravity removal of foreign matter. The cotton coming from the last drum 8 is picked up by the pins 16—16 and conveyed upwardly where it may be discharged directly to the gin stand or to any suitable conveyer 18.

The seed cotton is conducted to our improved cleaner by any suitable means. As one example, we have indicated at the top of the machine an inlet connection 19 connected to the eye of a suction fan 20. A screen 21 serves to retain the cotton sucked up through the inlet 19 by the suction fan. A drum 22 is positioned adjacent the screen 21 and may have slats or fingers 23 preferably of soft material, such as rubber, for removing the cotton from the screen 21 and dropping the same into the top of our cleaner and onto the upper drum 6. Obviously, other means may be provided for conducting the seed cotton to our cleaner, but the particular means shown is satisfactory, since it conducts the cotton in a somewhat steady stream and deposits the same continuously upon the upper drum 6.

The operation will be clear from the following description:

Cotton is conveyed to the top of the cleaner and drops onto the drum 6 and the inclined portion 10' of the screen 10, which permits some foreign matter to drop through and onto the pan 11. The pins 9—9 on the upper drum 6 convey the seed cotton over the screen 10, thus permitting much of the foreign material to fall through the screen and be deposited on the dirt pan 11, from which it is conducted away. The cotton, when it leaves the upper screen 10, drops off of the pins 9—9 on the drum 6 and onto the inclined screen portion 10'' and other foreign matter then falls through this portion of the screen. The cotton then falls upon the pins 9—9 carried by the drum 7. The drum 7 then conducts the cotton past the middle screen portion 10, thus permitting more of the foreign matter to become separated from the cotton and be removed. After leaving the drum 7, the cotton is again carried past a third screen, similar to those described, by the drum 8. If desired, a fingered or comb-like element 20' may be positioned adjacent the drums, so as to prevent cotton on the pins 9—9 from being carried completely around with the drums. The cotton, after leaving the drum or moving member 8, is picked up by the pins 16—16 on the elevator belt, which travels past the outlet from the drum 8. Due to the inclination of the elevator, the larger particles of foreign matter which could not pass through the screen 10 are permitted to fall by gravity away from the cotton which is being conveyed up on the pins 16—16, and thus larger foreign matter drops down and is carried away by the lower conveyer 12.

It will be observed that by rotating adjacent drums of the series 6—7—8 in opposite directions, the direction of the flow of cotton will be reversed and some dirt and foreign matter, which could not become separated so as to pass through the upper screen 10, 10', because it happens to be on the upper side of the cotton, may be permitted to drop through the middle screen 10, 10'', when the direction of movement is reversed.

The cotton, in passing through our improved cleaner, is not milled or balled up to any extent, and, on the contrary, the action of our cleaner is somewhat like carding, which tends rather to separate the cotton than to ball and felt it up. It has been an objection of former cotton cleaners, we believe, that they tended to mill and ball up the cotton, thus felting the same. This felting prevented an efficient cleaning, since foreign matter was entrained within the felted cotton, and when such felts reached the gin saws, the cotton was cut by the saws to a damaging extent. With our machine, cotton is maintained in a loose, fluffy condition, not substantially balled up or felted, and there is little cutting of the cotton fiber by the saws of the gin.

In order to assist the drum 8 in conveying cotton to the elevator we may interpose an auxiliary drum 24, similar to those described, between the elevator and drum 8. These last two drums preferably rotate in the same direction, as shown in Fig. 4.

With our cleaner preferably forming a separate unit not a part of any gin stand, it is possible to stop the operation of the cleaner in case a fire occurs in the gin or cleaner, and thus prevent the spread of fire.

It is to be understood that units as above described may be used alone or in series, that is, the cleaned cotton from one unit may be fed to a second similar unit, and so on, so as to clean the cotton more completely than can be done in a single unit.

While the invention has been described in some detail and preferred forms illustrated, we wish it understood that the invention may be otherwise embodied and that various changes and modifications may be made within the scope of the invention as defined in the appended claims.

We claim:

1. In a device of the character described, a movable device for conveying seed cotton, a screen extending beneath said movable device and adjacent the same for retaining seed cotton conveyed there along by said movable member but permitting foreign matter to pass therethrough, and an elevator to receive cotton from said movable member and including a steeply inclined belt, transverse slats secured to said belt at suitable intervals and tapered from a narrow leading edge close to the belt to provide an outer surface at such an inclination as to permit foreign material carried by the seed cotton to be carried off the slats by gravity and to be separated from the seed cotton, and pins projecting from said slats to engage said seed cotton for carrying it up said elevator.

2. In a device of the character described, a casing, a plurality of substantiallly horizontal drums arranged in series at different levels in said casing, adjacent drums being rotatably driven in opposite directions, screens positioned adjacent said drums at their sides and bottoms and extending alternately in opposite directions, dirt pans beneath different screens, and means carried by said drums for conducting seed cotton past said screens in series.

ROB L. GILLILAND.
HOUSTON McELHANNON.